Sept. 13, 1932.   C. E. NORTON   1,877,193
CAR TRANSFER DEVICE
Filed Jan. 26, 1928    5 Sheets-Sheet 1

Sept. 13, 1932.   C. E. NORTON   1,877,193
CAR TRANSFER DEVICE
Filed Jan. 26, 1928   5 Sheets-Sheet 2
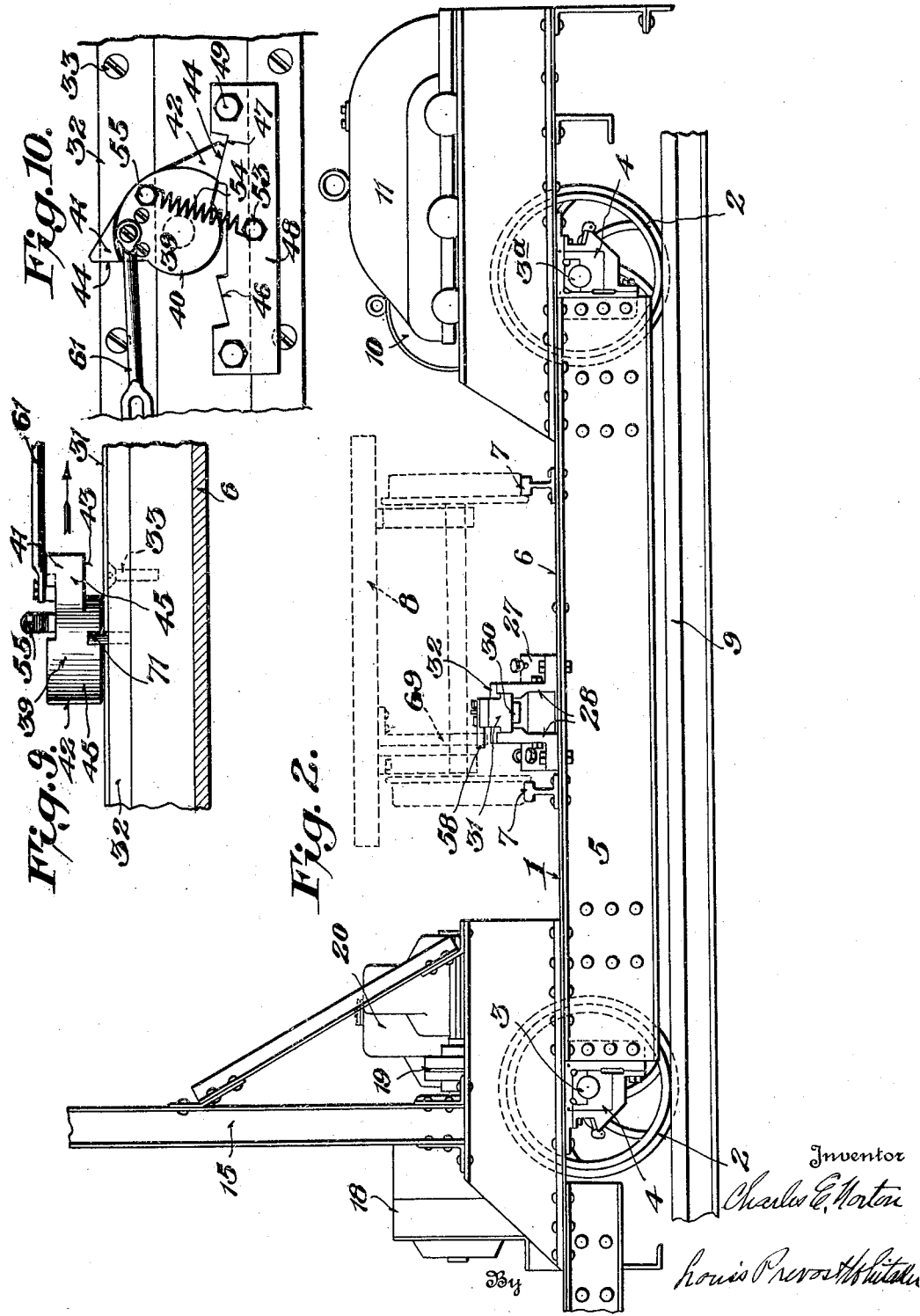

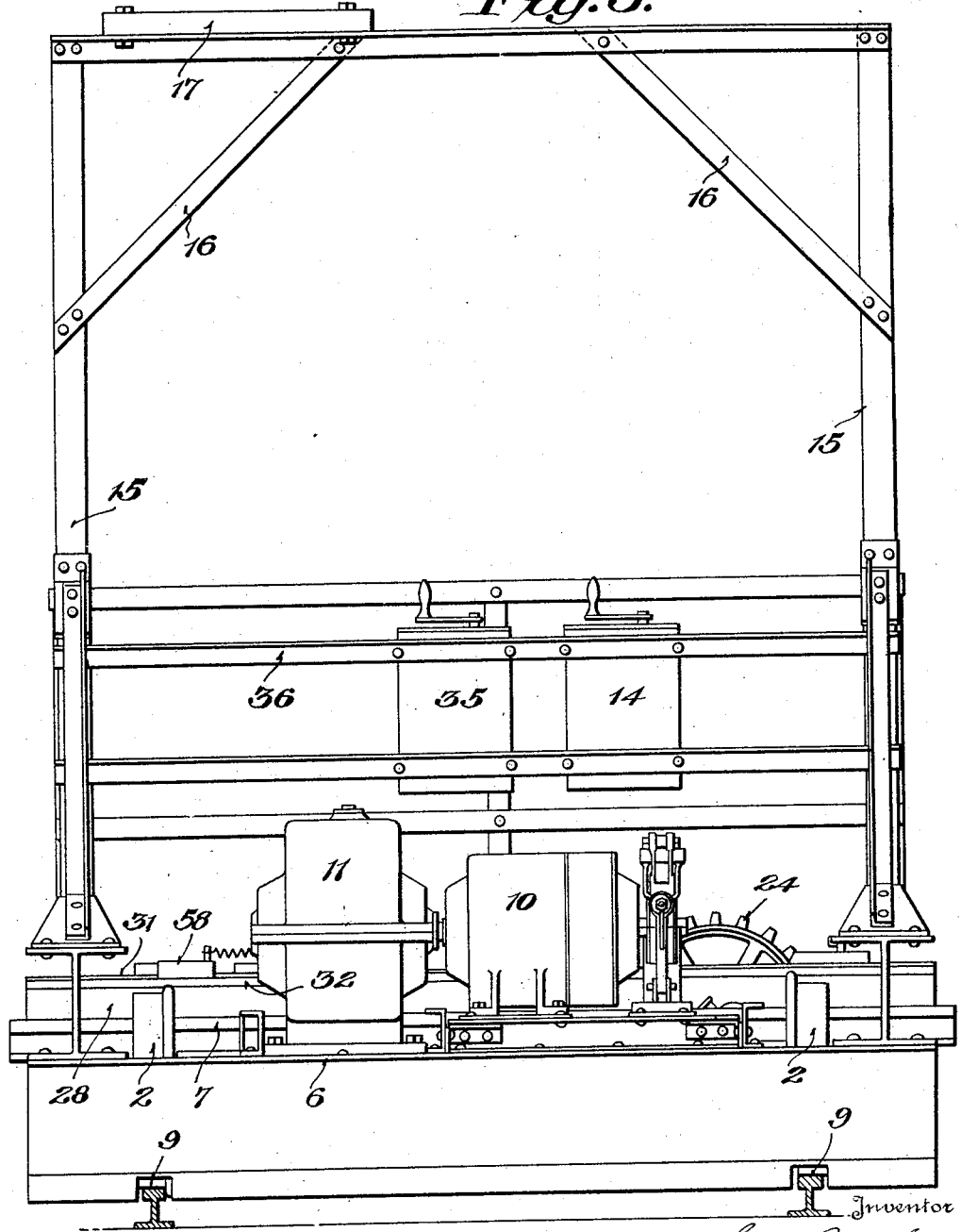

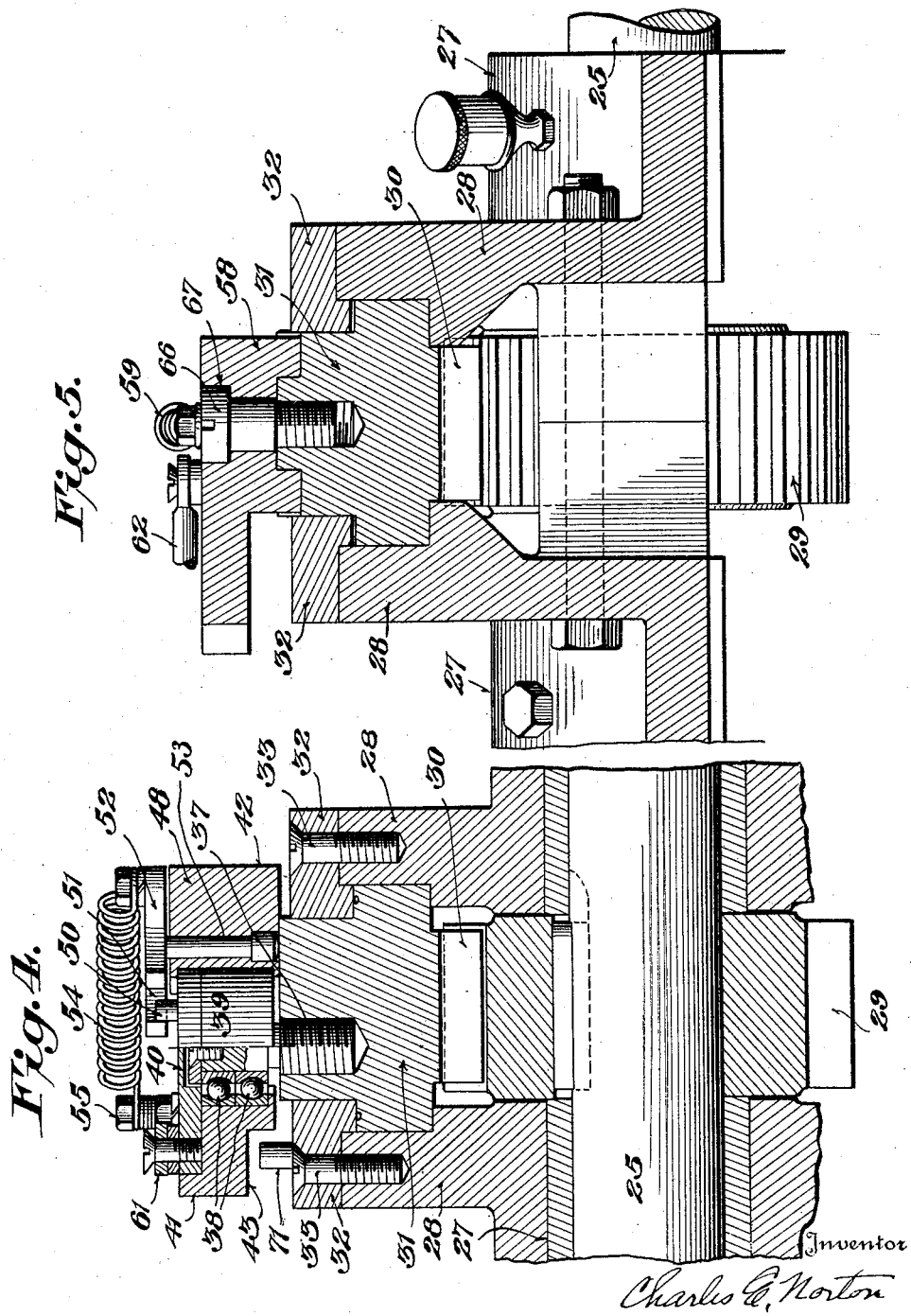

Sept. 13, 1932. C. E. NORTON 1,877,193
CAR TRANSFER DEVICE
Filed Jan. 26, 1928  5 Sheets-Sheet 5
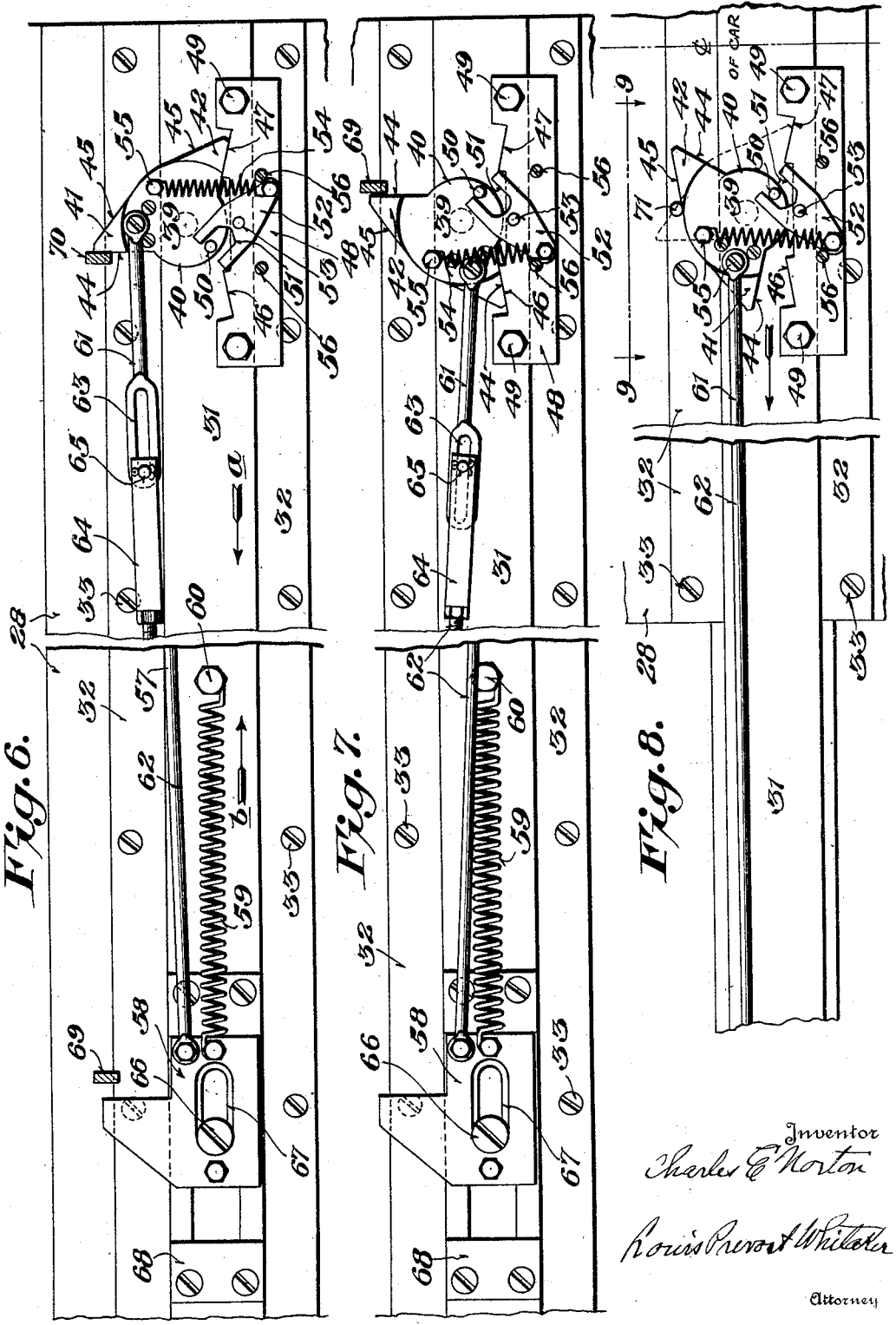
Inventor
Charles E. Norton
Louis Prevost Whitaker
Attorney Patented Sept. 13, 1932

1,877,193

UNITED STATES PATENT OFFICE

CHARLES E. NORTON, OF BRADFORD, PENNSYLVANIA, ASSIGNOR TO HANLEY COMPANY, OF BRADFORD, PENNSYLVANIA, A CORPORATION OF PENNSYLVANIA

CAR TRANSFER DEVICE

Application filed January 26, 1928. Serial No. 249,570.

This invention relates to transfer cars or trucks and particularly to a transfer car or truck adapted to meet the conditions arising in plants for the burning of ceramic products.

In brick plants the tracks, passing through the various units, such as drying, firing and unloading stations, are usually arranged parallel to each other and are substantially co-extensive and transfer tracks extending at right-angles thereto and at opposite ends of the drier, kiln and unloading tracks, are provided for transferring cars from the tracks of one of these stations to another station. It is for use upon these transfer tracks that the present truck is designed, so that cars may be transferred from one track in the plant to another track and the mechanism carried by the truck is constructed to pull a car off of one track, transfer it to another track and push it onto this track with the utmost rapidity consistent with safety.

The primary object of the invention is to provide a transfer truck embodying as a unitary structure the necessary means for driving it from one point to another in either direction and for pulling a car onto the truck and pushing it off of the same in an efficient and simple manner, and without jar sufficient to topple the load or destroy its equilibrium.

The present truck is designed essentially for plants where kiln cars are loaded directly at the forming machine and passed through the drier, transferred to the kiln, run directly through the kiln and transferred to an unloading point in a continuous and substantially uninterrupted path, but it will be obvious that this construction is readily adapted for either the transfer of kiln cars, or drier cars where such are used to pass wet bricks through the drier and then transferred to a point where they are unloaded onto kiln cars.

Another object of this invention is to provide a simple and efficient truck for the transfer of cars from one track to another in which an operator riding upon the truck may, through suitable mechanism, control all of its movements, that is to say, its travel from one point to another in order to receive and deliver cars and also the control of mechanism for pulling cars upon the truck and pushing them off of the same when desired.

Further objects of this invention will be apparent from a reading of the following specification taken in connection with the accompanying drawings which form a part of this application and in which Fig. 1 is a top plan view of the truck showing the pushing and pulling mechanism in normal or pulling position;

Fig. 2 is a side elevation;

Fig. 3 is an end view;

Fig. 4 is a detail cross sectional view taken through the rack bar and the forward dog when the latter is located above the rack bar drive shaft.

Fig. 5 is a sectional view taken on the line 5—5 of Fig. 1;

Fig. 6 is a detailed plan view of the rack bar with its associated pushing and pulling dogs arranged in pulling position;

Fig. 7 is a similar view showing the dogs in pushing position;

Fig. 8 is a detailed top plan view showing the manner in which the forward dog is reversed after the operation of pushing a car from the truck has been completed and so that it is again placed in position for pulling a car onto the truck;

Fig. 9 is a vertical sectional view taken on the line 9—9 of Fig. 8; and

Fig. 10 is a detailed top plan view of a modified front dog.

Figure 1:
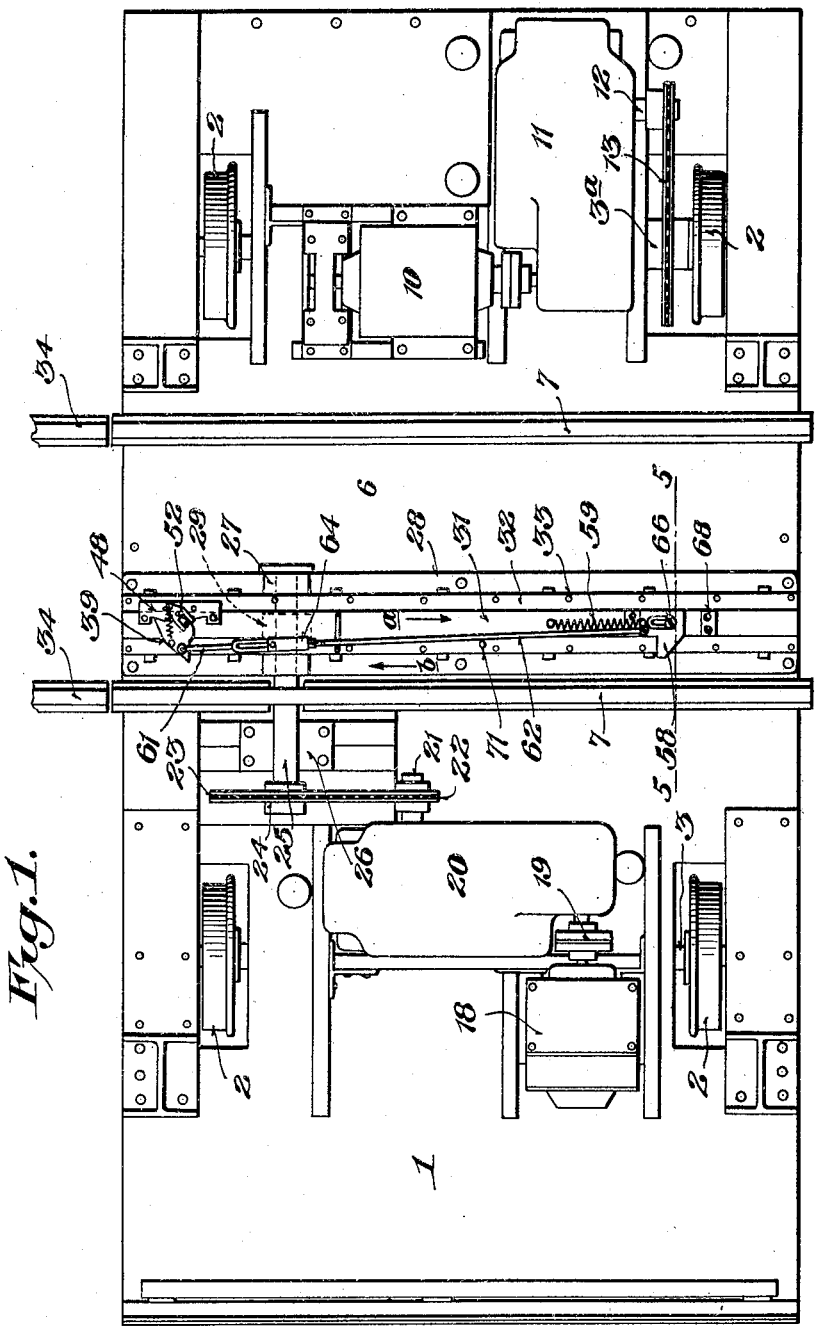

In the embodiment illustrated herein which has been adopted for the purpose of illustrating my invention, 1 indicates a frame supported upon wheels, 2, carried by the axles 3 and 3ª, mounted in bearings 4, secured to the side bars 5 of the frame. The frame is supplied with a platform 6 and I mount upon this platform suitable tracks 7 extending transversely of the truck and spaced to receive a kiln or other car indicated at 8 in dotted lines in Fig. 2.

At the right of the platform as viewed in Figs. 1 and 2 I mount suitable mechanism for driving the truck from point to point on the transfer tracks indicated at 9 in Fig. 3. This mechanism preferably consists of an electric motor 10 and suitable reduction gearing which is contained in a housing 11 from which a driving shaft 12 projects. This driving shaft is connected in any suitable manner to the axle 3ª, in this instance by a sprocket chain 13 passing over suitable sprocket wheels on the shaft 12 and axle 3ª.

The motor 10 is of the reversible type and receives its current through a controller 14 mounted upon the frame at the opposite end of the truck adjacent the driver's platform, which controller receives its current from any suitable supply main. I have shown and prefer to use a rectangular frame 15 supported upon the left-hand end of the truck as viewed in Figs. 1 and 2 which is braced as shown at 16 and provided with a supporting member 17 adapted to carry trolley wheels or other current collecting devices (not shown) through which current may be supplied to the controller 14 and through this controller to the motor 10.

The specific form of driving mechanism plays no part in the present invention except that it serves as a convenient means for driving the truck from one point to another and it will be understood that this type of driving mechanism may be modified in many respects without detracting in any way from its fundamental principles.

At the opposite end of the truck, namely adjacent the left-hand end as viewed in Figs. 1 and 2, I mount an electric motor 18 on the platform and connect the same through a suitable clutch 19 to the driving shaft of a reduction gearing which is carried in housing 20. The particular form of reduction gearing is unimportant and is not disclosed herein.

Projecting from the housing 20 is a driving shaft 21 carrying a sprocket 22 over which runs a sprocket chain 23 engaged with a sprocket wheel 24 carried upon one end of the rack driving shaft 25. This rack driving shaft is journalled in bearings 26 and 27, the latter formed in a rack guide 28.

The shaft 25 carries adjacent the end opposite the sprocket wheel 24 a pinion 29 which meshes with the teeth 30 formed on the under side of a rack bar 31 mounted to slide transversely of the truck in the rack guide 28, the bar being retained against vertical displacement by means of guard strips 32 secured in position upon the rack guide by lag screws 33.

As shown in Fig. 1 the rack guide extends transversely across the truck from side to side between the tracks 7 and in a direction parallel with said tracks and also parallel with the tracks of the drier, kiln or unloading tracks and when the truck has its tracks 7 aligned with either of these plant tracks the tracks 7 form a continuation of such plant tracks and are arranged closely adjacent thereto as shown in Fig. 1, the plant tracks being indicated at 34.

The motor 18 is also of the reversible type and receives its current from the trolley or other current collecting device mounted upon the support 17 and through a controller 35 mounted adjacent the controller 14 on braces 36 carried by the frame 15.

No attempt has been made to show the conductors leading from the current collecting device to the controllers 14 and 35 or from said controllers to their respective motors 10 and 18, as this does not form any part of the present invention and is well within the purview of the ordinary electrician.

Threaded into the rack bar adjacent one end thereof is a stud 37 carrying upon its upper end suitable ball bearings 38 upon which is mounted what I shall term the forward dog 39, this part being constructed as is shown in Figs. 6 to 9 and comprises a substantially circular body 40 having projecting fingers 41 and 42, the former of which is cut away upon its under side as shown at 43 for a purpose which will be hereinafter described. Each finger 41 and 42 is provided with a square shoulder 44 and with an inclined rear face 45 forming a cam surface the purpose of which will be explained later.

As shown in Figs. 6 to 8 the shoulders 44 of the dog 39 are spaced apart on the circle approximately 130° and each is adapted to engage an inclined abutment 46 or 47 on a stop plate 48 secured by suitable bolts 49 to the rack bar 31. Thus it will be seen that in turning from the position shown in Fig. 6 to the position shown in Fig. 7 the dog turns through an angle of a little more than 90°, thus bringing either shoulder 44 into a position where it is at direct right-angles to the rack bar.

The dog 39 has projecting above its upper surface a pin 50 which is engaged within the bifurcated end 51 of a spring-carrier 52 pivoted upon the plate 48 as shown at 53. The terminal of the spring-carrier 52 opposite the bifurcated end has secured thereto one end of a contractile spring 54 the opposite end of which is secured to a stud 55 in the line of symmetry of the dog so that when the dog is thrown in either direction the spring will be off-center and the dog held in such position until positively reversed.

The dog 39 may be held in either of the positions shown in Figs. 6 or 7 by a spring such as is shown in Fig. 10 which is connected to the stud 55 and at its opposite end to the stud 53 which is on the center line, thus dispensing with the spring-carrier 52. The spring-carrier however, is of decided advantage in that in either position of the dog the spring is entirely off-center and a greater leverage is obtained in throwing the dog from one position to the other when it has been moved past center. When the spring-carrier is employed I preferably provide stops 56 which limit the movement of the carrier as will be readily seen from an inspection of Figs. 6 and 7 and in this position the stud 50 is free of the side walls of the bifurcation so that the dog can trip past a projecting part on the car to be moved without throwing the dog beyond center.

Pivotally connected to the finger 41 of the front dog 39 is one end of a tension rod generally indicated at 57 whose opposite end is pivotally connected to a rear dog 58 mounted to slide upon the rack bar 31 and normally held in its forward position by a contractile spring 59 which has one end connected to the dog 58 and its opposite end to a fixed stud 60 on the rack bar.

The tension rod 57 is constructed in two sections 61 and 62, the former of which is provided with a longitudinal slot 63 and the latter of which is provided with a head 64 adjustable on the part 62 and carrying a stud 65 fitted and slidably mounted within the slot 63 so that the dog 39 may have movement with respect to the dog 58 and also with the dog 58. The dog 58 is guided in its movement on the rack bar by means of a screw stud 66 which is threaded into the rack bar and engages a slot 67 formed longitudinally in the dog. The dog is limited in its forward movement, as actuated by the spring 59, by engagement of the stud 66 with the rear end of the slot 67 and in its opposite movement the dog is limited by a fixed stop 68 secured to the rack bar.

In Fig. 2 where I have shown a kiln car indicated in dotted lines at 8 it will be seen that said car has depending therefrom an arm 69. This arm is shown in Fig. 6 in section and a similar arm 70 is also shown. These arms are arranged in line with one another longitudinally of the car but spaced considerable distances apart, or in other words approximately the total distance between the shoulder 44 of the finger 41 and the shoulder of the rear dog.

In the operation of the device the operator runs the truck along the tracks 9 until the tracks 7 on the truck are aligned with the tracks 34 of the plant. The motor 18 is then started or the clutch 19 thrown in so that the shaft 25 is driven in a direction to move the rack bar toward the tracks 34 and the kiln car thereon. When the rack bar has been moved across the truck sufficiently with its end protruding between the rails of the track 34 the front dog 39 will engage the front arm 69 on the car 8 and snap past the same, the spring 54 giving sufficiently to permit this without swinging beyond center. The section 61 of the tension rod 57 also moves rearwardly with the swinging of the dog, the stud 65 of the section 62 sliding in the slot 63.

After the finger 41 has passed the lug 69 and presented its shoulder 44 thereto the motor 18 is reversed which brings the shoulder 44 against the arm 69. The continued reverse movement of the rack bar toward its normal or inoperative position in the direction of the arrow "a", will draw the car 8 partially upon the tracks 7 of the transfer truck, the arm 69 being then positioned approximately on the longitudinal center line of the truck. The motor 18 is again reversed and the rack bar projected between the rails of the track 34 until the front dog snaps behind the lug 70 on the rear of the car 8. When this is done and the motor again rotated to pull the rack bar to normal position the car 8 will be drawn completely upon the track 7 and held in such position against accidental displacement by the arms 69 and 70 being positioned between the front and rear dogs 39 and 58. In this position the axle $3^a$ is driven through the operation of the motor 10 and reducing gearing until the tracks 7 are spotted with relation to plant tracks upon which it is desired to move the car 8. The shaft 25 is then again rotated so as to shift the rack bar and it will be noticed that in this operation the rack bar moves a short distance before the shoulder of the rear dog 58 is brought into engagement with the arm 69 of the car 8. This is done in order that the front dog may be free to pass the arm 70 in its swinging movement, as will presently appear. Further movement of the rack bar in the same direction causes the rear dog to remain stationary against the arm 69 until the stop 68 is brought into engagement with the rear end of the dog 58, at which time continued movement of the rack bar will push the car off of the truck onto the plant rails until the arm 69 reaches a position approximately at the center line of the truck. It will be noticed that in the rearward movement of the dog 58 or in other words the relative rearward movement with respect to the rack bar has caused the front dog to turn on its pivot by reason of the connection of the two dogs by the tension rod. When the stud 50 on the front dog engages the inner wall of the bifurcation of the spring-carrier this spring-carrier will be turned on its pivot 53 until the spring 54 swings beyond center, at which time it will exert its contracting force to throw the spring-carrier which will then act upon the stud 50 to bring the shoulder 44 of the finger 41 into engagement with the shoulder 46 on the stop plate 48. In this position the dog will have its cam surface 45 engaged with the arm 69 upon retraction of the rack bar in the direction of the arrow "a", and when the dog has snapped past the arm 69 the rack bar may be pushed in the direction of the arrow "b" so that the dog 39 pushing against the arm 69 will completely remove the car from the truck and place it on the plant tracks desired.

To restore the dog to normal position I mount upon the rack guide 28, or more correctly speaking upon one of the strips 32, a pin 71 which is positioned slightly to one side of the longitudinal center of the truck away from the shaft 25 and which is adapted to engage the cam surface 45 of the finger 42 when the dog is occupying the position shown in Fig. 7. Upon retraction of the rack bar in the direction of the arrow "a" from the final pushing movement the cam face 45 of the finger 42 will be brought into engagement with the pin 71 which will throw the dog over in a manner indicated in full lines in Fig. 8, to the position shown in dotted lines in said figure. The rack bar can then be advanced until its ends are even with the sides of the truck as shown in Fig. 1.

It will be noticed that the arm engaging portion of the rear dog 58 is elevated above the top of the pin 71 so that this dog may freely pass the pin in either direction of its movement. It will also be noticed that the cut-away portion 43 of the finger 41 permits this finger to pass over the pin freely in either direction while the full depth finger 42 of the dog will be engaged by this pin 71 when the rack bar is retracted to bring the dog back of the longitudinal center away from the shaft 25. It will, of course, be understood, however, that when the dog is snapped over by the action of the pin on the cam surface 45 of the finger 42, to the position shown in dotted lines in Fig. 8, the finger 41 with its cut-away portion 43 will then be over the pin and the rack bar will be free to move in either direction. It will also be understood that when the front dog is retracted into the position shown in Fig. 7 for the final pushing movement it is not moved far enough back to engage the pin 71 but only sufficiently far to snap back of the arm 69 which at that time is approximately on the longitudinal center line of the truck.

It will thus be seen that I have provided very simple, efficient and durable means for moving a car onto the transfer truck by two increments of movement and moving the car off of the truck by two similar increments of movement which may be defined generally as follows:

An arm reaches out from the truck and grabs a portion of the car to be moved and pulls the car partly upon the truck. The same arm reaches out again and grabs another portion of the car and pulls the same completely upon the truck. After the car has been transferred and the truck tracks spotted with the tracks upon which the car is to be placed the same arm pushes the car partly off the truck and is then retracted to engage another part of the car to push the same completely off the truck.

It will further be seen that I have provided a transfer car having mechanism to pull a car from a plant track onto the truck, transport the car to another plant track and push the same off of the truck onto said other track, all involving self-contained mechanism controlled by an operator riding directly upon the truck.

What I claim is:

1. In a car transfer device, the combination with a wheeled truck and a motor thereon having a driving connection with the wheels of said truck whereby the same may be driven in either direction, of track rails extending across said truck and adapted to receive and support a car, a member mounted to reciprocate across the truck, a pivoted element carried by said member adapted to engage a part of a car for either pushing or pulling, means for reciprocating said member, and means actuated in the pushing movement of said member for changing the position of said element from a pulling position to a pushing position.

2. In a car transfer device, the combination with a wheeled truck and means for driving the same in either direction, of track rails extending across said truck and adapted to receive and support a car thereon, a member mounted to reciprocate across the truck, a pivoted car engaging element carried by the member and adapted when said member is reciprocated to either pull a car onto said rails or push the same off of said rails, means operated in the pushing movement of said member for changing the position of said element from pulling position to pushing position, means for reciprocating said member and means for restoring said element to pulling position when the pushing operation has been completed.

3. A car transfer device comprising a wheeled truck, a motor mounted adjacent one end thereof and having a driving connection with the wheels thereof whereby the truck may be driven in either direction, a motor mechanism mounted upon the opposite end of the truck, track rails extending across the truck intermediate said driving motor and motor mechanism, and means also arranged between said driving motor and said motor mechanism and having a driving connection with said motor mechanism for pulling a car onto said rails or pushing a car off of said rails.

4. In a car transfer device, the combination with a wheeled truck and means for driving the same in either direction, of track rails extending across said truck and adapted to receive and support a car thereon, a member mounted to reciprocate across said truck, a combined pushing and pulling element carried by said member, a separate pushing element also carried by said member, and a connection between the combined pulling and pushing element and the pushing element which acts when said pushing element is operated to move the combined pushing and pulling element from pulling to pushing position, said combined pushing and pulling element and said pushing element acting to engage parts of a car when the member is reciprocated to either pull a car onto said rails or push a car from said rails.

5. In a car transfer device, the combination with a wheeled truck and means for driving the same in either direction, of track rails extending across said truck and adapted to receive and support a car thereon, a member mounted to reciprocate across said truck, means for reciprocating the same, a pivoted dog arranged at one end of said member and adapted to engage a car whereby when said member is reciprocated the dog may be used to either pull a car onto said rails or push a car off of said rails, a second dog slidably mounted on said member and adapted to engage a part of a car to assist in pushing the same off of said rails, and a connection between said pivoted and pushing dogs which operates when the pushing dog is in action to turn the pivoted dog from pulling to pushing position.

6. In a car transfer device, the combination with a wheeled truck and means for driving the same in either direction, of track rails extending across said truck and adapted to receive and support a car thereon, a member mounted to reciprocate across said truck, means for reciprocating the same, a pivoted dog arranged at one end of said member and adapted to engage a car whereby when said member is reciprocated the dog may be used to either pull a car onto said rails or push a car off of said rails, a second dog slidably mounted on said member and adapted to engage a part of a car to assist in pushing the same off of said rails, a connection between said pivoted and pushing dogs which operates when the pushing dog is in action to turn the pivoted dog from pulling to pushing position, and means operated in the movement of said member in one direction for turning said pivoted dog from pushing to pulling position.

7. In a car transfer device, the combination with a wheeled truck and means for driving the same in either direction, of track rails extending across said truck and adapted to receive and support a car thereon, a member mounted to reciprocate across said truck, means for reciprocating the same, a pivoted dog arranged at one end of said member and adapted to engage a car whereby when said member is reciprocated the dog may be used to either pull a car onto said rails or push a car off of said rails, a second dog slidably mounted on said member and adapted to engage a part of a car to assist in pushing the same off of said rails, and a rod connecting said pivoted and sliding dogs and having a lost motion connection in its length to permit of the tilting of said pivoted dog without affecting the sliding dog, said dogs adapted to cooperate in the reciprocation of said member to engage a part on a car and either pull the same upon said rails or push the car off of said rails.

8. In a car transfer device the combination with a wheeled truck and means for driving the same in either direction, of track rails extending across said truck, a member mounted to reciprocate across said truck, a pivoted dog carried by said member and adapted to engage a part of a car when the member is reciprocated to either pull the car onto said rails or push the same off of said rails, resilient means acting to normally hold the dog in either pulling or pushing position, a second dog slidably mounted on said member and a connection between said pivoted and sliding dogs which permits the tilting of the pivoted member to pass the car part without moving the sliding dog, said connection adapted to turn the pivoted dog from pulling to pushing position when the pushing dog is operated to push the car off the rails.

9. In a car transfer device the combination with a wheeled truck and means for driving the same in either direction, of track rails extending across said truck, a member mounted to reciprocate across said truck, a pivoted dog carried by said member and adapted to engage a part of a car when the member is reciprocated to either pull the car onto said rails or push the same off of said rails, an abutment carried by said member, means to hold said dog against said abutment in either pushing or pulling position, a pushing dog also carried by said member and a connection between said pushing dog and pivoted dog which permits the pivoted dog to tilt away from the abutment to pass the part on the car without disturbing the pushing dog.

10. In a car transfer device, the combination with a wheeled truck and means for driving the same in either direction, of track rails extending across said truck, a member mounted to reciprocate across said truck, a pivoted dog carried by said member and adapted to engage a part of a car when the member is reciprocated to either pull the car onto said rails or push the same off of said rails, an abutment carried by said member, a spring connected to said pivoted dog in the line of symmetry thereof for holding said dog in either pushing or pulling position against said abutment, a sliding dog mounted on said member and adapted to cooperate with said pivoted dog in pushing a car off of said rails, and means forming a lost motion connection between said sliding dog and said pivoted dog which permits tilting of said pivoted dog to pass the part on the car which it engages in either pulling the car onto the tracks or pushing the same off of the tracks, said connecting means also serving to turn said pivoted dog from pulling to pushing position when the pushing dog is operated, and means for reciprocating said member.

11. In a car transfer device, the combination with a wheeled truck and means for driving the same in either direction, of track rails extending across said truck, a member mounted to reciprocate across said truck, a pivoted dog carried by said member and adapted to engage a part of a car when the member is reciprocated to either pull the car onto said rails or push the same off of said rails, said dog having pushing and pulling shoulders, an abutment member arranged to be engaged by the inactive shoulder, a spring connected to the dog, a dog tripping device carried by the abutment, said spring being connected to said tripping member and positioned off-center when the dog is in either pulling or pushing position, a sliding dog carried by said member and adapted to cooperate with the pivoted dog in pushing a car off of said rails, a connection between said sliding dog and said pivoted dog which throws the pivoted dog beyond center when the sliding dog is being used to push a car off the rails whereby the spring and tripping member can operate to throw the pivoted dog to pushing position, and means for restoring the pivoted dog to pulling position.

12. In a car transfer device, a wheeled truck, track rails extending across the same and adapted to receive and support a car, means arranged at one side of said rails for driving a truck in either direction, means arranged between the rails for pulling a car onto the rails or pushing a car off of the rails and means mounted on the opposite side of the rails from the truck driving means for operating the car pushing and pulling means.

13. In a car transfer device, the combination with a wheeled truck and means for driving the same in either direction, of track rails extending transversely across said truck, a housing mounted between said rails, a rack bar slidably mounted in said housing, a combined pulling and pushing dog pivotally mounted on said rack bar and having pushing and pulling shoulders, an abutment carried by the rack bar adapted to be engaged by either the pushing or pulling shoulder, a pushing dog slidably mounted upon the rack bar, means to limit the sliding movement of said pushing dog, a rod connecting said pivoted and sliding dogs and having a lost motion connection in its length, a resilient means for holding said pivoted dog in either pulling or pushing position to permit said pivoted dog to tilt past a part on a car so that said part may be engaged by one of the shoulders to either pull or push the car, said rod serving also to turn the pivoted dog from pulling position to pushing position when the sliding pushing dog is operated, means for restoring the pivoted dog to pulling position, and means for reciprocating the rack bar in either direction.

14. In combination with a car provided at separated points longitudinally thereof with engaging means, of a car transfer truck comprising a wheeled frame, track rails extending transversely across said frame and adapted to receive and support said car, means carried by the frame and constructed to be projected laterally beyond said frame to cooperate with certain of said engaging means to pull said car onto said tracks, means on said frame for cooperating with other of said engaging means to push the car off of said tracks, and means carried by the frame for operating said pulling and pushing means.

15. In combination with a car provided at separated points with engaging means, of a car transfer truck comprising a wheeled frame, track rails extending transversely across said frame to receive and support the car on said truck, reciprocating means carried by said frame and having a stroke less than the movement of the car to place it on the truck, said means successively cooperating with said engaging means on the car to pull said car onto the tracks.

16. In combination with a car provided at separated points with engaging means, of a car transfer truck comprising a wheeled frame, track rails extending tranversely across said frame to receive and support the car on said truck, reciprocating means carried by said frame and having a stroke less than the movement of the car to place it on the truck, said means comprising a combined pulling and pushing pawl, and a pushing member operatively connected to the pulling and pushing pawl to shift the latter from pulling to pushing position upon pushing operation of said pushing pawl.

17. In combination with a car provided with depending engaging means arranged at separated points longitudinally thereof, of a transfer truck comprising a wheeled frame having track rails extending over the same, car pulling and pushing means on said frame comprising a reciprocating part having a stroke less than the movement of the car to place it on the truck, an element movable with said part to successively engage said engaging means to pull a car onto said truck, means movable with and relative to said part to exert a pushing force on a car to remove it from said truck and operatively connected to said element to shift the same from pulling to pushing position whereby said element may cooperate with said means to push a car from said truck.

18. The combination with a car provided at separated points longitudinally thereof with engaging means, of a car transfer truck comprising a wheeled frame and transversely disposed track rails to receive and support the car, transversely disposed guiding means carried by the frame, transversely reciprocating car pushing and pulling means engaging said guiding means and capable of being projected laterally beyond the lateral edges of the transfer truck, and provided with devices located at separated points longitudinally thereof for co-operating with the separated engaging means on the car in moving the car on to and off of said transfer truck, and power means carried by said transfer truck for reciprocating said car pushing and pulling means.

In testimony whereof I affix my signature.

CHARLES E. NORTON.